(12) United States Patent
Heilmann

(10) Patent No.: US 12,214,656 B2
(45) Date of Patent: Feb. 4, 2025

(54) CHARGING DOOR ASSEMBLY OR TANK DOOR ASSEMBLY OF A MOTOR VEHICLE, AND MOTOR VEHICLE

(71) Applicant: Dr. Ing. h.c. F. Porsche Aktiengesellschaft, Stuttgart (DE)

(72) Inventor: Tassilo Heilmann, Pforzheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 18/159,094

(22) Filed: Jan. 25, 2023

(65) Prior Publication Data
US 2023/0241965 A1    Aug. 3, 2023

(30) Foreign Application Priority Data
Feb. 2, 2022    (DE) .......................... 102022102402.4

(51) Int. Cl.
*B60K 15/05* (2006.01)
*B62D 25/24* (2006.01)

(52) U.S. Cl.
CPC .............. *B60K 15/05* (2013.01); *B62D 25/24* (2013.01); *B60K 2015/0515* (2013.01)

(58) Field of Classification Search
CPC . B60K 15/05; B60K 2015/0515; B62D 25/24
USPC ..................................................... 296/97.22
See application file for complete search history.

(56) References Cited

U.S. PATENT DOCUMENTS

| 9,688,137 B2 | 6/2017 | Takahashi et al. |
| 10,322,635 B2 | 6/2019 | Meinl et al. |

FOREIGN PATENT DOCUMENTS

| DE | 102014115907 A1 | 5/2016 | |
| DE | 102019100787 A1 * | 7/2020 | ............. B60K 15/05 |
| DE | 102020115360 A1 * | 12/2020 | |
| DE | 102020112178 A1 | 11/2021 | |
| GB | 2412097 B | 6/2007 | |
| JP | 2012081796 A | 4/2012 | |
| JP | 6551821 B2 | 7/2019 | |

OTHER PUBLICATIONS

DE-102019100787-A1 (Antrag et al.) (Jul. 16, 2020) (Machine Translation) (Year: 2020).*

* cited by examiner

*Primary Examiner* — Mahmoud Gimie
(74) *Attorney, Agent, or Firm* — LEYDIG, VOIT & MAYER, LTD.

(57) ABSTRACT

A charging or tank door assembly of a motor vehicle, including a base body receiving a charging socket or a tank inlet, a door body pivotable about an axis of rotation and supporting a panel body on a first position, and a push-push mechanism for locking the door body and releasing the door body in the first position. In the first position, the door body closes an opening in a body of the motor vehicle and blocks access to the charging socket or to the tank inlet. In a second position, the door body releases the opening of the body of the motor vehicle and the access to the charging socket or to the tank inlet. Relative to the first position, the push-push mechanism is arranged on a different side of the axis of rotation than the first portion, supporting the panel body, of the door body.

13 Claims, 2 Drawing Sheets

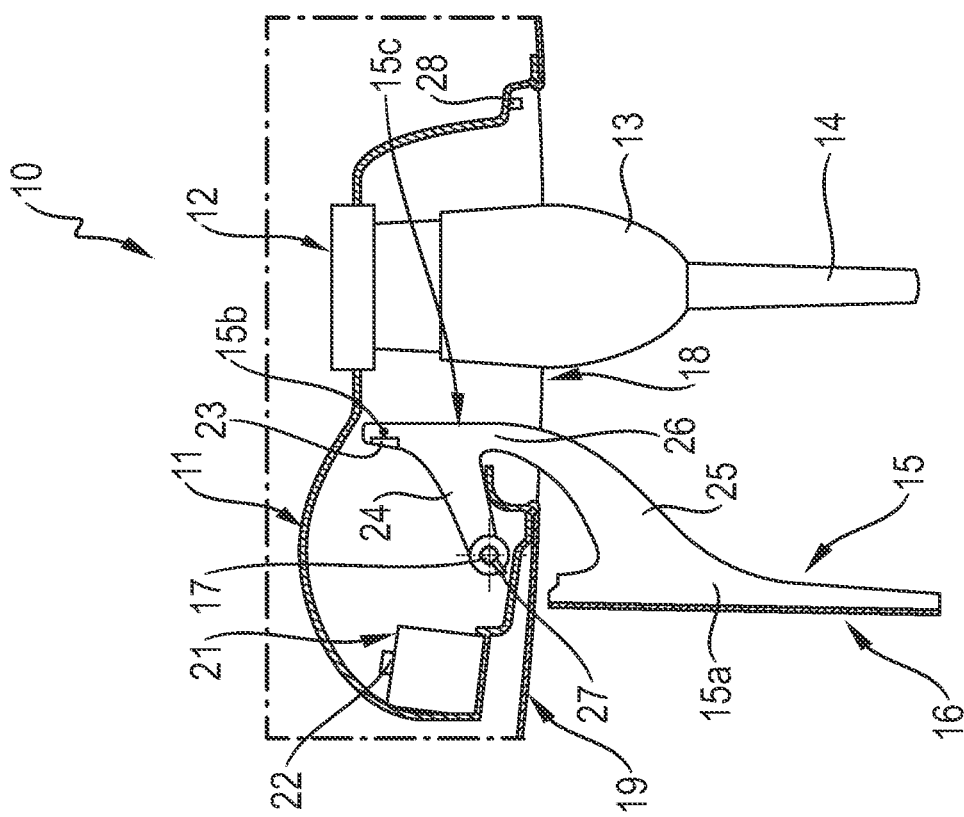
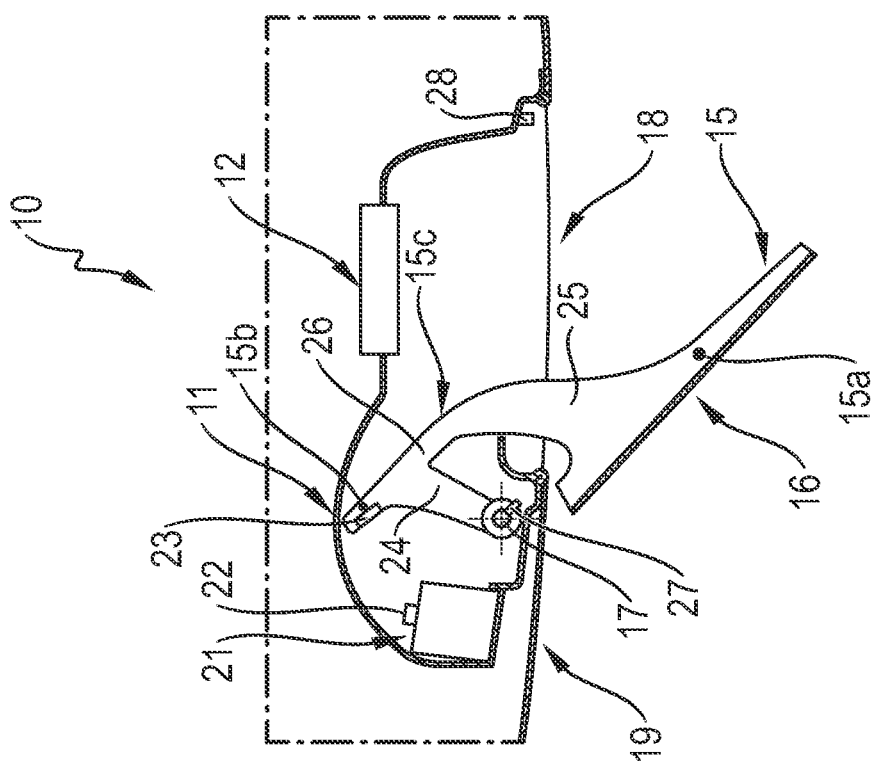

CHARGING DOOR ASSEMBLY OR TANK DOOR ASSEMBLY OF A MOTOR VEHICLE, AND MOTOR VEHICLE

CROSS-REFERENCE TO PRIOR APPLICATION

This application claims benefit to German Patent Application No. DE 10 2022 102 402.4, filed on Feb. 2, 2022, which is hereby incorporated by reference herein.

FIELD

The invention relates to a charging door assembly or tank door assembly of a motor vehicle. The invention also relates to a motor vehicle having a charging door assembly or tank door assembly.

BACKGROUND

Motor vehicles have charging door assemblies and/or tank door assemblies. A tank door is used to release or block access to a tank inlet. A charging door assembly is used to release or block access to an electrical charging socket. A hybrid vehicle has both a tank door assembly and a charging door assembly. Purely electrically driven vehicles have only a charging door assembly.

DE 10 2014 115 907 A1 discloses a charging door assembly of a motor vehicle configured as an electric vehicle. The charging door assembly has a charging socket received by a base body. Furthermore, the charging door assembly has a pivotable door body, which is pivotable about an axis of rotation. In a first position of the door body, the door body closes an opening in a body of the motor vehicle and blocks access to the charging socket. In a second position of the door body, the door body releases the opening of the body of the motor vehicle and the access to the charging socket or to the charging inlet. The charging door assembly has a push-push mechanism comprising a tappet and an actuating element, in order to provide a push-push function for locking and releasing the door body. When the charging door is open, the push-push mechanism is visible and accessible.

DE 10 2020 112 178 A1 and GB 2 412 097 B disclose further charging door assemblies of motor vehicles.

If the push-push mechanism is visible when the door body is open, the aesthetic overall impression is affected as a result. Furthermore, the push-push mechanism may be damaged during a charging operation or fueling operation. In addition, the door body must be relatively large in order for said door body to cover or hide the push-push mechanism when in the closed position.

SUMMARY

In an embodiment, the present disclosure provides a charging or tank door assembly of a motor vehicle, comprising a base body receiving a charging socket or a tank inlet. The charging or tank door assembly also comprises a door body which is pivotable about an axis of rotation and supports a panel body on a first portion, wherein, in a first position of the door body, the door body closes an opening in a body of the motor vehicle and blocks access to the charging socket or to the tank inlet, and wherein, in a second position of the door body, the door body releases the opening of the body of the motor vehicle and the access to the charging socket or to the tank inlet. The charging or tank door assembly also comprises a push-push mechanism for locking the door body and for releasing the door body in the first position thereof, wherein, relative to the first position of the door body, the push-push mechanism is arranged on a different side of the axis of rotation of the door body than the first portion, supporting the panel body, of the door body.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 shows the section of FIG. 1 in a position of the door body in which said door body partially releases the opening in the body of the motor vehicle; and FIG. 4 shows the section of FIG. 1 in a second position of the door body, in which said door body fully releases the opening in the body of the motor vehicle along with a charging plug of a charging cable.

DETAILED DESCRIPTION

Figure 1:
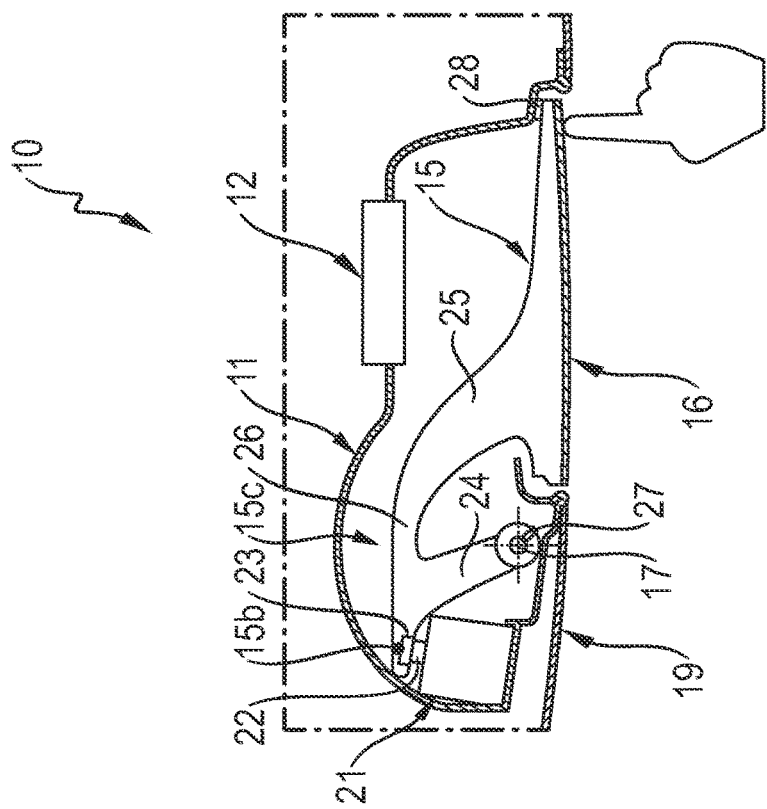
FIG. 1 shows a section of a motor vehicle according to an embodiment of the invention in the area of a charging or tank door assembly according to an embodiment of the invention in a first position of a door body, in which said door body closes an opening in a body of the motor vehicle.

In an embodiment, the present invention provides a novel charging door assembly or tank door assembly of a motor vehicle and a motor vehicle having a charging door assembly or tank door assembly.

The charging or tank door assembly according to an embodiment of the invention comprises a base body receiving a charging socket or a tank inlet.

The charging or tank door assembly according to an embodiment of the invention furthermore comprises a door body, which can be pivoted about an axis of rotation and supports a panel body on a first portion, wherein, in a first position of the door body, said door body closes an opening in a body of the motor vehicle and blocks access to the charging socket or to the tank inlet, and wherein, in a second position of the door body, said door body releases the opening of the body of the motor vehicle and the access to the charging socket or to the tank inlet.

The charging or tank door assembly according to an embodiment of the invention furthermore comprises a push-push mechanism for locking the door body and for releasing the door body in the first position thereof, wherein, relative to the first position of the door body, the push-push mechanism is arranged on a different side of the axis of rotation of the door body than the first portion, supporting the panel body, of the door body.

Due to fact that, relative to the first position of the door body, the push-push mechanism is positioned on the other side of the axis of rotation than the first portion, supporting the panel body, of the door body, the push-push mechanism is not visible when the door body is open. Said push-push mechanism therefore does not affect the aesthetic overall impression. Furthermore, there is no risk of damage to the push-push mechanism during a charging operation or fueling operation. Furthermore, smaller-sized door bodies may be used.

Preferably, relative to the second position of the door body, the push-push mechanism is arranged on the same side of the axis of rotation of the door body as the first portion, supporting the panel body, of the door body. This ensures that the charging jack or the tank inlet is easily accessible when the door body is open.

Preferably, in the first position of the door body, a second portion of the door body cooperates with the push-push mechanism such that the second portion supports or forms a counter-locking element cooperating with a locking element of the push-push mechanism. In particular, the second portion of the door body is configured as an extension of a connecting leg of a preferably U-shaped third portion of the door body. In the first position of the door body, the locking element cooperates with the counter-locking element to lock the door body in the first position. After actuating the push-push mechanism, the locking element releases the counter-locking element and thus the door body.

Preferably, the push-push mechanism is arranged behind the body of the motor vehicle in a depression limited at least in sections by the base body. This is particularly preferred in order to provide a particularly advantageous aesthetic impression and to avoid risk of damage to the push-push mechanism during a charging operation or fueling operation.

FIGS. 1 to 4 show sections of a motor vehicle in the area of a charging or tank door assembly 10 according to an embodiment of the invention, wherein an embodiment of the invention is described below for a charging door assembly 10. However, embodiments of the invention may also be used in a tank door assembly. FIGS. 1 to 4 show different states of the charging door assembly 10.

The charging door assembly 10 has a base body 11 which receives a charging socket 12. For a charging operation, a charging plug 13 of a charging cable 14 (see FIG. 4) can be connected to the charging socket 12.

The charging socket 12 is arranged in a depression defined at least in sections by the base body 11.

The charging door assembly 10 furthermore has a door body 15 which supports a panel body 16 on a first portion 15a. The door body 15 is pivotable about an axis of rotation 17.

In the first position of the door body 15 shown in FIG. 1, said door body closes an opening 18 in a body 19 of the motor vehicle, wherein the door body 15 then blocks access to the charging socket 12. In the first position of the door body 15 (see FIG. 1), the panel body 16 of the charging door assembly 10 received on the first portion 15a of the door body 15 is flush with the surface of the body 19 of the motor vehicle, wherein a gap 20 is formed between the panel body 16 and the body 19 in the first position of FIG. 1.

In the second position of the door body 15 (see FIG. 4), said door body releases the opening 18 of the body 19 of the motor vehicle and the access to the charging socket 12.

The charging door assembly 10 furthermore has a push-push mechanism 21 for locking the door body 15 in the first position of FIG. 1 and for releasing the door body 15, likewise in the first position of FIG. 1. Relative to the first position of the door body 15 (see FIG. 1), the push-push mechanism 21 is arranged on a different side of the axis of rotation 17 of the door body 15 than the first portion 15a, supporting the panel body 16, of the door body 15.

In the second position of the door body 15 (see FIG. 4), the push-push mechanism 21 and the first portion 15a, supporting the panel body 16, of the door body 15 are preferably both arranged on the same side of the axis of rotation 17 of the door body 15.

The door body 15 has a second portion 15b, which cooperates with the push-push mechanism 21 in the first position of the door body 15. The push-push mechanism 21 has a locking element 22, which cooperates with a counter-locking element 23, wherein, in the first position (see FIG. 1) of the door body 15, in order to lock said door body, the locking element 22 of the push-push mechanism 21 projects into the counter-locking element 23 of the second portion 15b of the door body 15 and in particular positively locks the door body 15. The counter-locking element 23 is part of or received by the second portion 15b of the door body 15.

Figure 2:
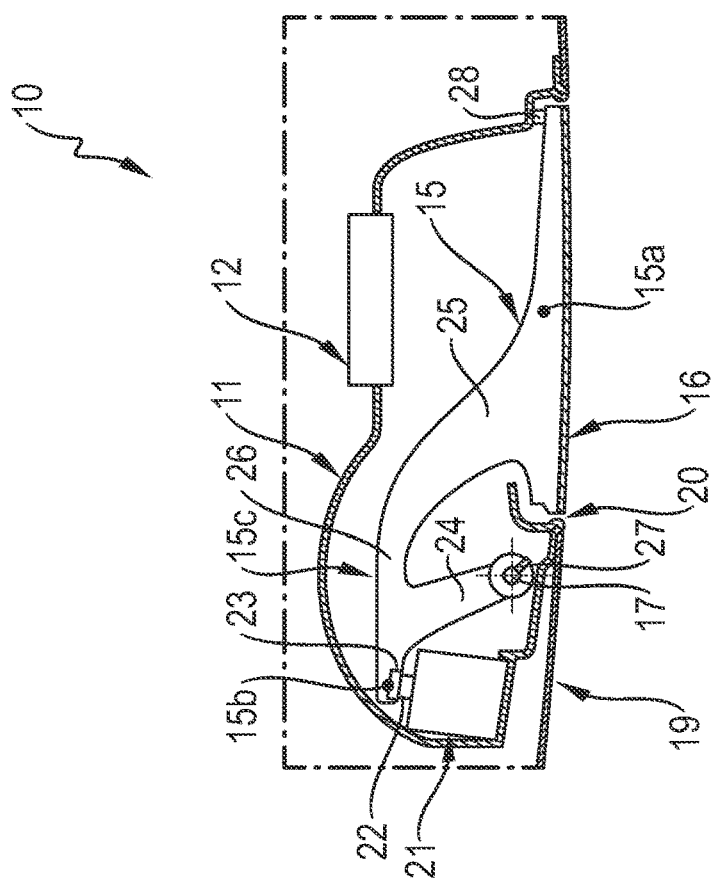
FIG. 2 shows the section of FIG. 1 when actuated to release the opening in a body of the motor vehicle.

If the door body 15 is actuated manually according to FIG. 2, the second portion 15b of the door body 15 is pressed against the locking element 22 of the push-push mechanism 21, wherein the locking element 22 is then twisted and then the counter-locking element 23 thus releases the door body 15 so that said door body can then be pivoted about the axis of rotation 17 to release the opening 18, namely beyond the intermediate position shown in FIG. 3, to the fully opened second position of FIG. 4.

The first portion 15a, supporting the panel body 16, of the door body 15 is connected to the axis of rotation 17 via a third, in particular U-shaped, portion 15c of the door body 15. A first leg 24 of the third portion 15c of the door body 15 engages in the axis of rotation 17, a second leg 25 of the third portion 15c engages in the first portion 15a of the door body 15. A connecting leg 26 of the third portion 15c extends between these two legs 24 and 25 and connects the two legs 24, 25. The second portion 15b of the door body 15 is configured as an extension of the connecting leg 26 of the third portion 15c, wherein the second portion 15b of the door body 15 extends the connecting leg 26 of the third portion 15c beyond the first leg 24.

The first portion 15a of the door body 15 is parallel or approximately parallel to the second portion 15b of the door body 15 and to the connecting leg 26 of the third portion 15c of the door body 15. The first leg 24 and the second leg 24 are parallel or approximately parallel to one another and preferably at an angle not equal to 90° to the first portion 15a and second portion 15b of the door body 15.

As can be seen in FIGS. 1 to 4, the push-push mechanism 21 is arranged within the depression defined at least in sections by the base body 11, namely behind the body 19 of the motor vehicle. Even when the door body 15 is open (see FIG. 4), the push-push mechanism 21 is not visible from the outside so that it does not affect the design and there is no risk of damage to said push-push mechanism during a charging operation.

A spring element 27 cooperates with the axis of rotation 17. This spring element 27 provides a spring force that tends to automatically transfer the door body 15 from the first position of FIG. 1 to the second position of FIG. 4. When transferring the door body 15 from the second position of FIG. 4 toward the first position of FIG. 1, the door body 15 must be pivoted against the spring force of this spring element 27. By the locking element 22 of the push-push mechanism 21 engaging with the counter-locking element 23, the door body 15 can then be locked in order to retain said door body in the closed first position of FIG. 1 against the spring force of the spring element 27.

A heart-curve mechanism is preferably integrated into the push-push mechanism 21 and causes the door body 15 to be locked or released as a result of the actuation of the door body via the interplay of the locking element 22 and the counter-locking element 23.

FIGS. 1 to 4 furthermore show a sealing element 28 which engages in the base body 11 and seals the door body 15 in the closed state thereof against the base body 11. This sealing body 28 is in particular a rubber seal, which also provides a dampening function for the door body 15.

The charging door assembly 10 according to an embodiment of the invention has the advantage that the push-push mechanism 21 does not affect the design thereof. There is also no risk of damage to the push-push mechanism 21 during a charging operation. The door body 15 can be relatively small.

Embodiments of the invention are not limited to charging door assemblies but may also be used in tank door assemblies in which the charging socket 12 is replaced by a tank inlet.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the

The invention claimed is:

1. A charging or tank door assembly of a motor vehicle, the charging or tank door assembly comprising:
   a base body configured to receive a charging socket or a tank inlet;
   a door body which is coupled to the base body at a pivot point such that it is pivotable about an axis of rotation defined by the pivot point and supports a panel body on a first portion,
      wherein, in a first position of the door body, the door body is configured to close an opening in a body of the motor vehicle and to block access to the charging socket or to the tank inlet, and
      wherein, in a second position of the door body, the door body is configured to release the opening of the body of the motor vehicle and the access to the charging socket or to the tank inlet; and
   a push-push mechanism configured to lock the door body and to release the door body in the first position thereof, wherein, relative to the first position of the door body, the push-push mechanism is arranged on a different side of the axis of rotation of the door body than the first portion, supporting the panel body, of the door body.

2. The charging or tank door assembly according to claim 1, wherein, relative to the second position of the door body, the push-push mechanism is arranged on a same side of the axis of rotation of the door body as the first portion, supporting the panel body, of the door body.

3. The charging or tank door assembly according to claim 1, wherein in the first position of the door body, a second portion of the door body cooperates with the push-push mechanism such that the second portion of the door body supports or forms a counter-lock cooperating with a lock of the push-push mechanism.

4. The charging or tank door assembly according to claim 1, wherein the first portion, supporting the panel body, of the door body is connected to the pivot point via a third portion of the door body, wherein a first leg of the third portion engages with the pivot point, wherein a second leg of the third portion engages in the first portion, and wherein the first leg and the second leg are connected via a connecting leg.

5. The charging or tank door assembly according to claim 4, wherein the second portion of the door body is formed as an extension of the connecting leg of the third portion of the door body.

6. The charging or tank door assembly according to claim 4, wherein the second portion of the door body extends the connecting leg of the third portion beyond the first leg thereof.

7. The charging or tank door assembly according to claim 1, wherein the push-push mechanism is arranged behind the body of the motor vehicle in a depression limited at least in sections by the base body.

8. The charging or tank door assembly according to claim 1, wherein a spring cooperates with the pivot point, a spring force of the spring displacing the door body to the second position.

9. A motor vehicle having the charging or tank door assembly according to claim 1.

10. The charging or tank door assembly according to claim 4, wherein the third portion is U-shaped.

11. The charging or tank door assembly according to claim 1, wherein the push-push mechanism comprises a push-push device or locking element.

12. The charging or tank door assembly according to claim 1,
   wherein in the first position of the door body, a second portion of the door body is configured to cooperate with the push-push mechanism such that the second portion of the door body supports or forms a counter-lock cooperating with a lock of the push-push mechanism,
   wherein the first portion, supporting the panel body, of the door body is connected to pivot point via a third portion of the door body, wherein a first leg of the third portion directly couples to the pivot point, wherein a second leg of the third portion is coupled to the first portion, and wherein the first leg and the second leg are ridgidly connected via a connecting leg, and
   wherein the second portion of the door body is an extension of the connecting leg of the third portion, the second portion extending beyond the first leg in a direction away from the first portion.

13. A charging or tank door assembly of a motor vehicle, the charging or tank door assembly comprising:
   a base body forming a partial enclosure configured to receive a charging socket or a tank inlet;
   a door body, which is coupled to the base body at a pivot point such that it is pivotable about an axis of rotation, the door body further comprising a mating extent configured to mate with a panel body along a mating length, the mating length defined by all points of contact between the door body and the panel body,
      wherein, in a first position of the door body, the door body is configured to close an opening in a body of the motor vehicle and to block access to the charging socket or to the tank inlet by the panel body being positioned to mate with a portion of the body of the motor vehicle to block an opening of the partial enclosure of the base body, and wherein, in a second position of the door body, the door body is configured to release the opening of the body of the motor vehicle and the access to the charging socket or to the tank inlet by positioning the panel body away from the body of the motor vehicle; and a push-push mechanism configured to lock the door body and to release the door body in the first position thereof, wherein, relative to the first position of the door body, the push-push mechanism is arranged on a different side of the axis of rotation than all or most points of contact between the door body and the panel body.

* * * * *